US008090675B2

(12) United States Patent
Chambers et al.

(10) Patent No.: US 8,090,675 B2
(45) Date of Patent: Jan. 3, 2012

(54) HVAC SYSTEM THAT CONTROLS AN ASSET VIA A WIDE AREA NETWORK IN ACCORDANCE WITH A BUSINESS STRATEGY USING PREDICTOR AND RESPONDER DATA POINTS

(75) Inventors: Gregory L. Chambers, Atlanta, GA (US); Kenneth D. Van Meter, Alpharetta, GA (US)

(73) Assignee: Prenova, Inc., Atlanta, GA (US)

( * ) Notice: Subject to any disclaimer, the term of this patent is extended or adjusted under 35 U.S.C. 154(b) by 584 days.

(21) Appl. No.: 12/133,098

(22) Filed: Jun. 4, 2008

(65) Prior Publication Data
US 2009/0132069 A1 May 21, 2009

Related U.S. Application Data

(60) Provisional application No. 60/988,939, filed on Nov. 19, 2007.

(51) Int. Cl.
*G06F 15/00* (2006.01)
(52) U.S. Cl. .......................................... 706/62; 700/277
(58) Field of Classification Search .................. 706/12, 706/20, 25, 45, 62; 703/1; 700/1, 28, 30, 700/276–279, 299, 300
See application file for complete search history.

(56) References Cited

U.S. PATENT DOCUMENTS

| 5,566,084 | A | * | 10/1996 | Cmar | ............................ 700/276 |
|---|---|---|---|---|---|
| 5,596,507 | A | * | 1/1997 | Jones et al. | ................... 700/276 |
| 5,761,083 | A | | 6/1998 | Brown et al. | |
| 5,924,486 | A | | 7/1999 | Ehlers et al. | |
| 6,211,782 | B1 | | 4/2001 | Sandelman et al. | |
| 6,241,156 | B1 | | 6/2001 | Kline et al. | |
| 6,306,032 | B1 | * | 10/2001 | Scheffler et al. | ................. 454/71 |
| 6,741,915 | B2 | | 5/2004 | Poth | |
| 6,851,621 | B1 | | 2/2005 | Wacker et al. | |
| 6,868,295 | B2 | | 3/2005 | Huang | |
| 6,961,641 | B1 | | 11/2005 | Forth et al. | |
| 7,216,043 | B2 | | 5/2007 | Ransom et al. | |
| 7,659,813 | B2 | | 2/2010 | Chambers et al. | |
| 2002/0022991 | A1 | | 2/2002 | Sharood et al. | |
| 2003/0171851 | A1 | | 9/2003 | Brickfield et al. | |

(Continued)

FOREIGN PATENT DOCUMENTS
EP 1196003 4/2002
(Continued)

OTHER PUBLICATIONS

Chambers; U.S. Appl. No. 12/126,556, filed May 23, 2008.
(Continued)

*Primary Examiner* — David Vincent
(74) *Attorney, Agent, or Firm* — Thomas, Kayden, Horstemeyer & Risley, LLP

(57) ABSTRACT

Included are embodiments for asset commissioning. At least one embodiment of a method includes classifying at least one data point of an environment controlling asset as a responder data point and classifying at least one other data point of the environment controlling asset as a predictor data point, the at least one predictor data point configured to provide operation validation data regarding the at least one responder data point. Some embodiments include validating operation of the at least one responder data point by monitoring sensor data associated with the at least one responder data point and the at least one predictor data point.

20 Claims, 7 Drawing Sheets

U.S. PATENT DOCUMENTS

| | | |
|---|---|---|
| 2003/0225483 A1 | 12/2003 | Santinato et al. |
| 2004/0102937 A1* | 5/2004 | Ibrahim .......................... 703/2 |
| 2004/0225513 A1 | 11/2004 | Haeberle et al. |
| 2005/0038571 A1 | 2/2005 | Brickfield et al. |
| 2005/0192915 A1* | 9/2005 | Ahmed et al. .................. 706/21 |
| 2005/0243867 A1 | 11/2005 | Petite |
| 2005/0275525 A1 | 12/2005 | Ahmed |
| 2005/0278597 A1 | 12/2005 | Miguelanez |
| 2006/0105697 A1 | 5/2006 | Aronstam et al. |
| 2006/0191275 A1 | 8/2006 | Jung et al. |
| 2006/0234621 A1* | 10/2006 | Desrochers et al. .......... 454/239 |
| 2006/0288101 A1 | 12/2006 | Mastrodonato et al. |
| 2007/0005191 A1 | 1/2007 | Sloup et al. |
| 2007/0038700 A1 | 2/2007 | Eryurek et al. |
| 2007/0067656 A1 | 3/2007 | Ranganathan et al. |
| 2007/0255536 A1* | 11/2007 | Simmons et al. ................. 703/1 |
| 2007/0279210 A1* | 12/2007 | Li et al. .......................... 340/506 |
| 2010/0010679 A1* | 1/2010 | Kassel ........................... 700/278 |
| 2010/0114550 A1* | 5/2010 | Fujihara et al. ................. 703/13 |

FOREIGN PATENT DOCUMENTS

| | | |
|---|---|---|
| GB | 2467981 | 8/2010 |
| GB | 2471759 | 1/2011 |
| WO | 2010033038 | 3/2010 |
| WO | 2011014073 | 2/2011 |

OTHER PUBLICATIONS

Chambers; U.S. Appl. No. 12/126,566, filed May 23, 2008.
International Search Report and Written Opinion, dated Sep. 3, 2008.
Chambers, U.S. Appl. No. 11/619,838, filed Jan. 4, 2007.
Clark, G. et al., "Artificial Intelligence and Networking in Integrated Building Management Systems." Automation in Construction, Elsevier Science Publishers, Amsterdam NL, vol. 5, No. 506, Sep. 1, 1997, pp. 481-198.
European Search Report dated Oct. 13, 2008 for PCT/US2007060271.
International Search Report and Written Opinion dated Oct. 24, 2007, for PCT/US2007060271.
Chambers, U.S. Appl. No. 12/133,098, filed Jun. 4, 2008.

* cited by examiner

508

| | |
|---|---|
| ENVIRONMENT TEMPERATURE | 4, 5, 6, 7, 8 |
| SUPPLY TEMPERATURE | 4, 5, 6, 7, 8 |
| RETURN TEMPERATURE | 4 |
| OUTSIDE AIR TEMPERATURE | NOAA |
| HEAT 1 | 2 |
| HEAT 2 | 2 |
| COOL 1 | 2 |
| COOL 2 | 2 |
| FAN START/STOP | 2, 4, 5, 6, 7, 8 |
| MIXED AIR TEMPERATURE | 3, 4 |

FIG. 5

HVAC SYSTEM THAT CONTROLS AN ASSET VIA A WIDE AREA NETWORK IN ACCORDANCE WITH A BUSINESS STRATEGY USING PREDICTOR AND RESPONDER DATA POINTS

CROSS REFERENCE

This application claims the benefit of U.S. Provisional Application No. 60/988,939, entitled "Asset Control," filed Nov. 19, 2007, which is entirely incorporated herein by reference.

BACKGROUND

Utilization of one or more assets, including but not limited to, heater systems, air conditioning systems, refrigeration systems, alarm systems, security systems, appliances, electronics, and/or other devices associated with an environment and/or business equipment may result in a large amount of energy consumed and associated asset repair service costs. As energy costs may be a significant portion of a home's and/or business's budget, reduction of energy consumption and associated expenses may be desired. Additionally, these systems may have efficiency problems with regard to determining correct operation of one or more components in such systems.

Although these problems may be partially addressed by the inclusion of system parameter options and/or utilization of a customer service representative to reactively intervene and maintain such systems, such solutions are generally difficult to utilize and often result in system ineffectiveness, which may introduce further problems.

SUMMARY

Included are embodiments for asset commissioning. At least one embodiment of a method includes classifying at least one data point of an environment controlling asset as a responder data point and classifying at least one other data point of the environment controlling asset as a predictor data point, the at least one predictor data point configured to provide operation validation data regarding the at least one responder data point. Some embodiments include validating operation of the at least one responder data point by monitoring sensor data associated with the at least one responder data point and the at least one predictor data point.

Also included are embodiments of a system. At least one embodiment of a system includes a first classifying component configured to classify at least one data point of an environment controlling asset as a responder data point and a second classifying component configured to classify at least one other data point of the environment controlling asset as a predictor data point, the at least one predictor data point configured to provide operation validation data regarding the at least one responder data point. Some embodiments include a validating component configured to validate operation of the at least one responder data point by monitoring sensor data associated with the at least one responder data point and the at least one predictor data point.

Other systems, methods, features, and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 5 depicts an exemplary table, illustrating settings that an asset may be configured to control, such as the asset from FIG. 4.

DETAILED DESCRIPTION

Figure 1:
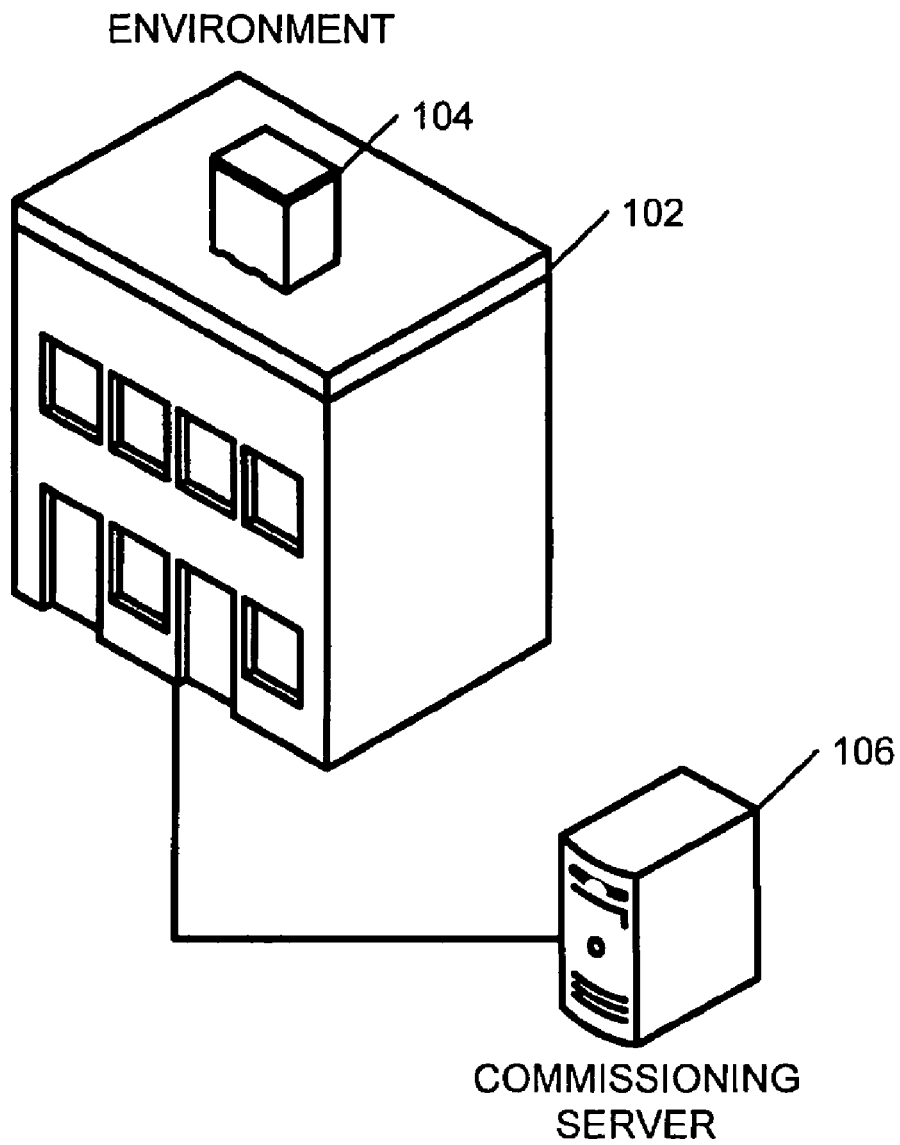
FIG. 1 depicts an exemplary environment coupled to a commissioning server.

FIG. 1 depicts an exemplary environment coupled to a commissioning server. As illustrated in FIG. 1, an asset 104, which may be embodied as a rooftop unit, may serve an environment 102. More specifically, the asset 104 may be configured to provide heating, air conditioning and/or other services to the environment 102. Additionally, a commissioning server 106 may be coupled to the environment 102 to provide controlling data to the asset 104.

Figure 2:
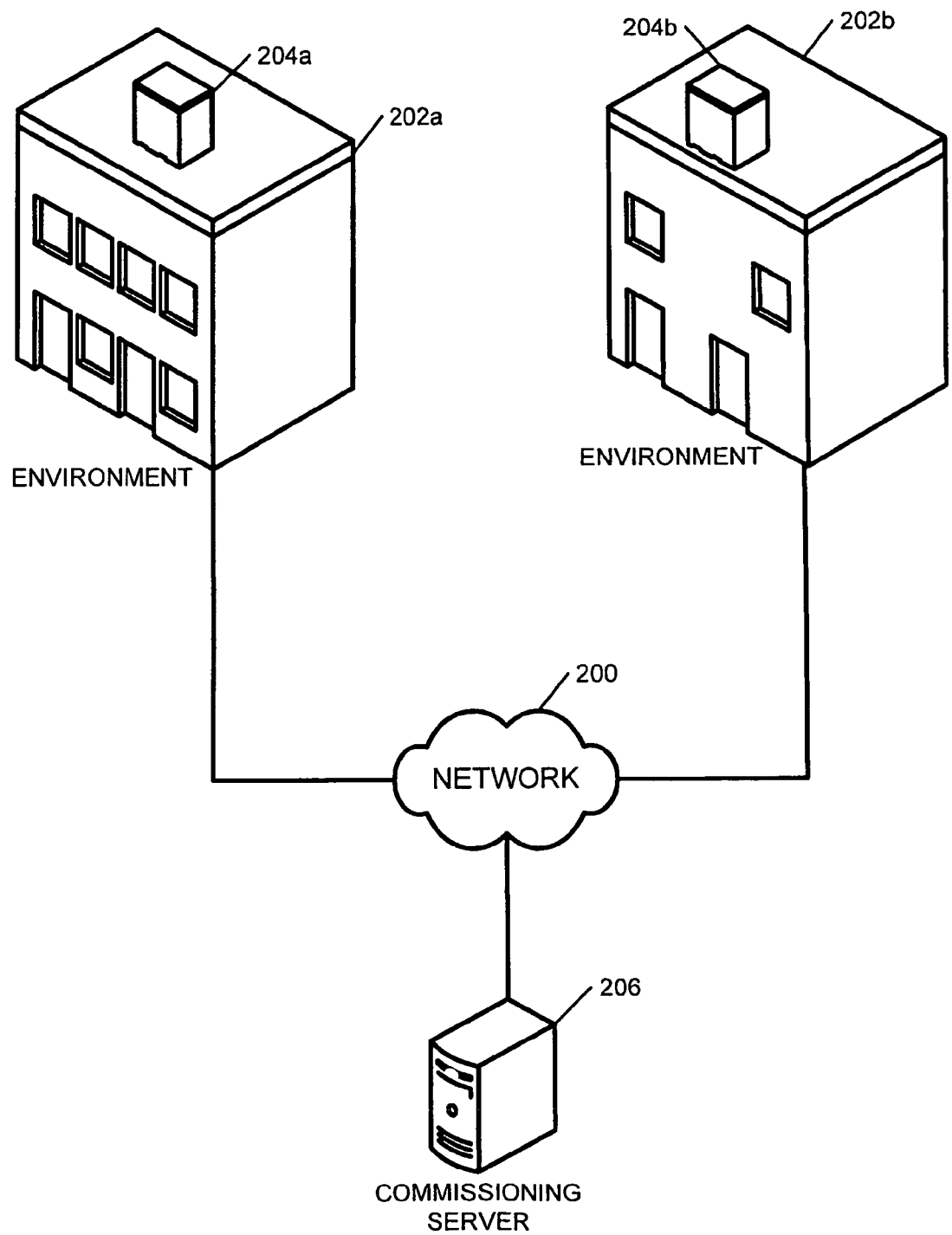
FIG. 2 depicts a plurality of exemplary environments coupled to a commissioning server, similar to the diagram from FIG. 1

FIG. 2 depicts a plurality of exemplary environments 202a, 202b coupled to a commissioning server 206, similar to the diagram from FIG. 1. FIG. 2 illustrates environments 202a and 202b being served by assets 204a and 204b, respectively. Additionally a commissioning server 206 may be coupled to a network 200 to provide remote commissioning to the assets 204. The network 200 may include the Internet or other wide area network (WAN), a local area network (LAN), a public switched telephone network (PSTN) a cellular network, and/or other networks.

Figure 3:
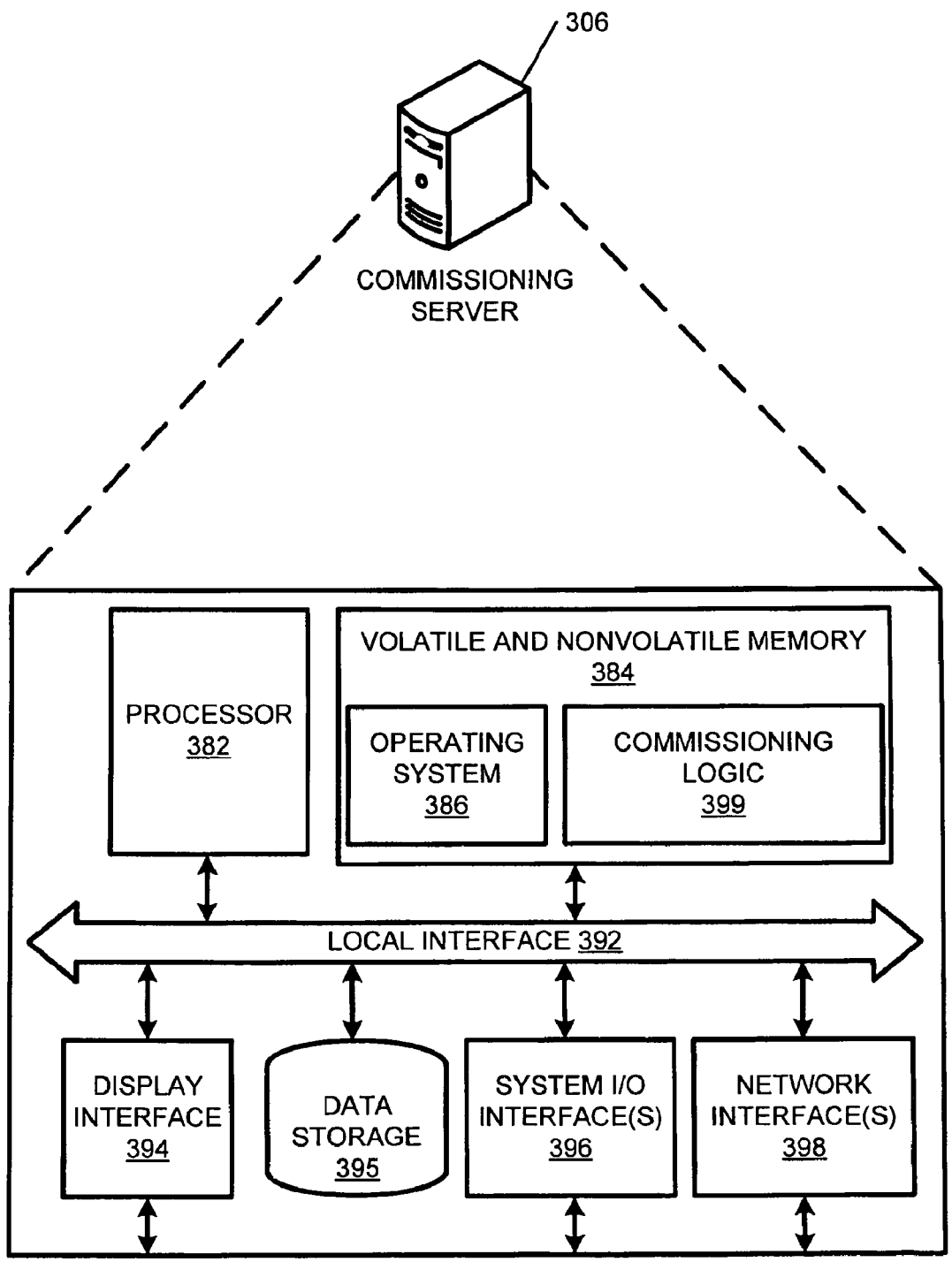
FIG. 3 depicts exemplary components that may be utilized in a commissioning server, such as the commissioning server from FIG. 1.

FIG. 3 depicts exemplary components that may be utilized in a commissioning server, such as the commissioning server from FIG. 1. Although a wire-line device is illustrated, this discussion can be applied to wireless devices, as well. Generally, in terms of hardware architecture, as shown in FIG. 3, the commissioning server 306 includes a processor 382, memory component 384, a display interface 394, data storage 395, one or more input and/or output (I/O) device interface(s) 396, and/or one or more network interface 398 that are communicatively coupled via a local interface 392. The local interface 392 can include, for example but not limited to, one or more buses or other wired or wireless connections. The local interface 392 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 382 may be a device for executing software, particularly software stored in memory component 384.

The processor 382 can be any custom made or commercially available processor, a central processing unit (CPU), an auxiliary processor among several processors associated with the commissioning server 306, a semiconductor based microprocessor (in the form of a microchip or chip set), a macroprocessor, or generally any device for executing software instructions.

The memory component 384 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 384 may incorporate electronic, magnetic, optical, and/or other types of storage media. One should note that the memory component 384 can have a distributed architecture (where various components are situated remote from one another), but can be accessed by the processor 382. Additionally memory component 384 can include commissioning logic 399 and an operating system 386.

The software in memory component 384 may include one or more separate programs, each of which includes an ordered listing of executable instructions for implementing logical functions. In the example of FIG. 3, the software in the memory component 384 may include commissioning logic 399, as well as operating system 386. The operating system 386 essentially controls the execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the memory component 384, so as to operate properly in connection with the operating system 386.

The input/output devices that may be coupled to system I/O Interface(s) 396 may include input devices, for example but not limited to, a keyboard, mouse, scanner, microphone, etc. Further, the input/output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Additionally included are one or more network interfaces 398 for facilitating communication with one or more other devices. More specifically, network interface 398 may include any component configured to facilitate a connection with another device. While in some embodiments, among others, the commissioning server 306 can include a network interface 398 that includes a personal computer memory card international association (PCMCIA) card (also abbreviated as "PC card") for receiving a wireless network card, however this is a nonlimiting example. Other configurations can include the communications hardware within the computing device, such that a wireless network card is unnecessary for communicating wirelessly. Similarly, other embodiments include network interfaces 398 for communicating via a wired connection. Such interfaces may be configured with universal serial bus (USB) interfaces, serial ports, and/or other interfaces.

If commissioning server 306 includes a personal computer, workstation, or the like, the software in the memory component 384 may further include a basic input output system (BIOS) (omitted for simplicity). The BIOS is a set of software routines that initialize and test hardware at startup, start the operating system 386, and support the transfer of data among the hardware devices. The BIOS is stored in ROM so that the BIOS can be executed when the commissioning server 306 is activated.

When commissioning server 306 is in operation, the processor 382 may be configured to execute software stored within the memory component 384, to communicate data to and from the memory component 384, and to generally control operations of the commissioning server 306 pursuant to the software. Software in memory, in whole or in part, may be read by the processor 382, perhaps buffered within the processor 382, and then executed.

One should note that while the description with respect to FIG. 3 includes a commissioning server as a single component, this is a nonlimiting example. More specifically, in at least one embodiment, commissioning server 306 can include a plurality of servers, personal computers, and/or other devices. Similarly, while commissioning logic 399 is illustrated in FIG. 3 as a single software component, this is also a nonlimiting example. In at least one embodiment, commissioning logic 399 may include one or more components, embodied in software, hardware, and/or firmware. Additionally, while commissioning logic 399 is depicted as residing on a single computing device, as commissioning server 306 may include one or more devices, commissioning logic 399 may include one or more components residing on one or more different devices.

Figure 4:
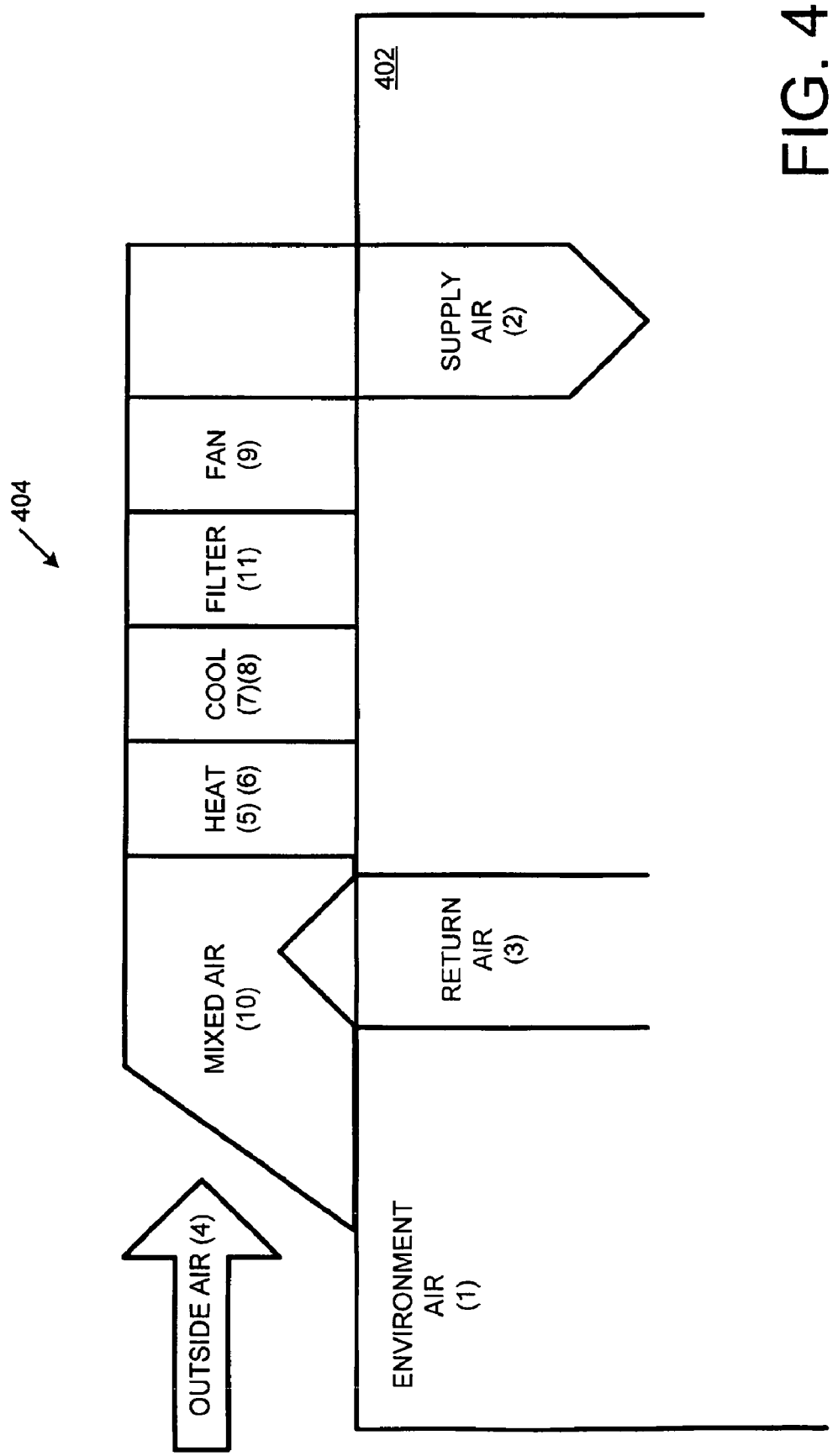
FIG. 4 depicts exemplary components of an asset, such as the asset from FIG. 1.

FIG. 4 depicts exemplary components of an asset, such as the asset from FIG. 1. As illustrated in FIG. 4, the environment 402 may be coupled to an asset 404. Additionally included in FIG. 4 are environment air (1), supply air (2), return air (3), outside air (4), heat (5) (6), cool (7) (8), filter (11), fan (9), and mixed air (10). More specifically, table 508 represents various relationships between one or more HVACs and/or parts of an HVAC.

As a nonlimiting example, in operation, the environment 402 may expel return air with a return air temperature (3), which may include air to be recycled and reconditioned back into the environment 402. Additionally, the environment air may have an associated environment air temperature (1), which may be the temperature of a room in the environment 402. Similarly, the outside air may enter the asset 404, with an outside air temperature (4). A mixture between the return air coming from the environment 402 and the air outside is referred to as mixed air. The mixed air may have a mixed air temperature (10). Through the asset 404, air runs through a series of four compartments, which include heating, cooling, filter and fan. In some embodiments, the fan is the last compartment because the fan draws in the air across the other stages through the filter, through the heating and/or cooling and into the environment 402. Once the air has been tempered by the asset 404, the air is sent to the environment 402 as supply air at a supply air temperature (2).

Accordingly, in the configuration of FIG. 4, at least a portion of the data points (1)-(8) may be connected as a predictor and/or responder to at least one other data point. Sometimes a point can have multiple predictors and multiple responders; other times there is only one. Similarly, in at least one circumstance a predictor and/or responder is not calculated with in the system, but retrieved from a remote location.

More specifically, as a nonlimiting example, there may be one or more points illustrated in FIG. 4 that can alter environment air temperature (1), such as heating and cooling. Heating and/or cooling can be turned on and there may be a response in the environment air temperature (1). Accordingly, environment air temperature (1) could be commissioned via (5), (6), (7), (8), and also (4), the outside air temperature. Thus, proper operation of the environment air temperature (1) may be validated by moving points (4), (5), (6), (7), (8) and performing normal system operation.

FIG. 5 depicts an exemplary table 508, illustrating settings that an asset may be configured to control, such as the asset from FIG. 4. As illustrated in the exemplary table 508 of FIG. 5, environment temperature (which may be labeled as a responder component) may be associated with outside air (4), heat (5) (6), and cool (7) (8) (which may be labeled as predictor components) from FIG. 4. More specifically, this indicates that the environment temperature can be verified via an analysis of components (4), (5), (6), (7), and (8). Thus, the environment temperature can be determined and compared with a value derived from readings from the outside air (4), heat (5) (6), and cool (7) (8). If this comparison does not yield a predetermined desired result (within a predetermined threshold), it may be determined that the outside air sensing device is not operating properly (and/or that one of the components (4), (5), (6), (7), and (8) are not operating properly). However, a more definite determination of the nature of the error can be made by cross-checking one or more of the other components (4), (5), (6), (7), and (8) with its corresponding predictor components. Similarly, supply temperature may be verified in a similar manner, utilizing a similar analysis as utilized with environment temperature and/or a variation thereof.

In a similar manner, return temperature (3) may be verified with a measure of the outside air temperature (4). Outside air temperature (4) may be verified via a reading from the national oceanic atmospheric administration (NOAA) and/or other remote temperature reading source. Heat 1, (5) heat 2 (6), cool 1 (7), and cool 2 (8) may be verified with the supply air temperature (2). Fan start/stop may be verified with the supply air (2), the outside air (4), the heat (5), (6), and the cool (7), (8). Additionally, mixed air temperature may be verified by the return air temperature (3) and the outside air temperature (4).

Figure 6:
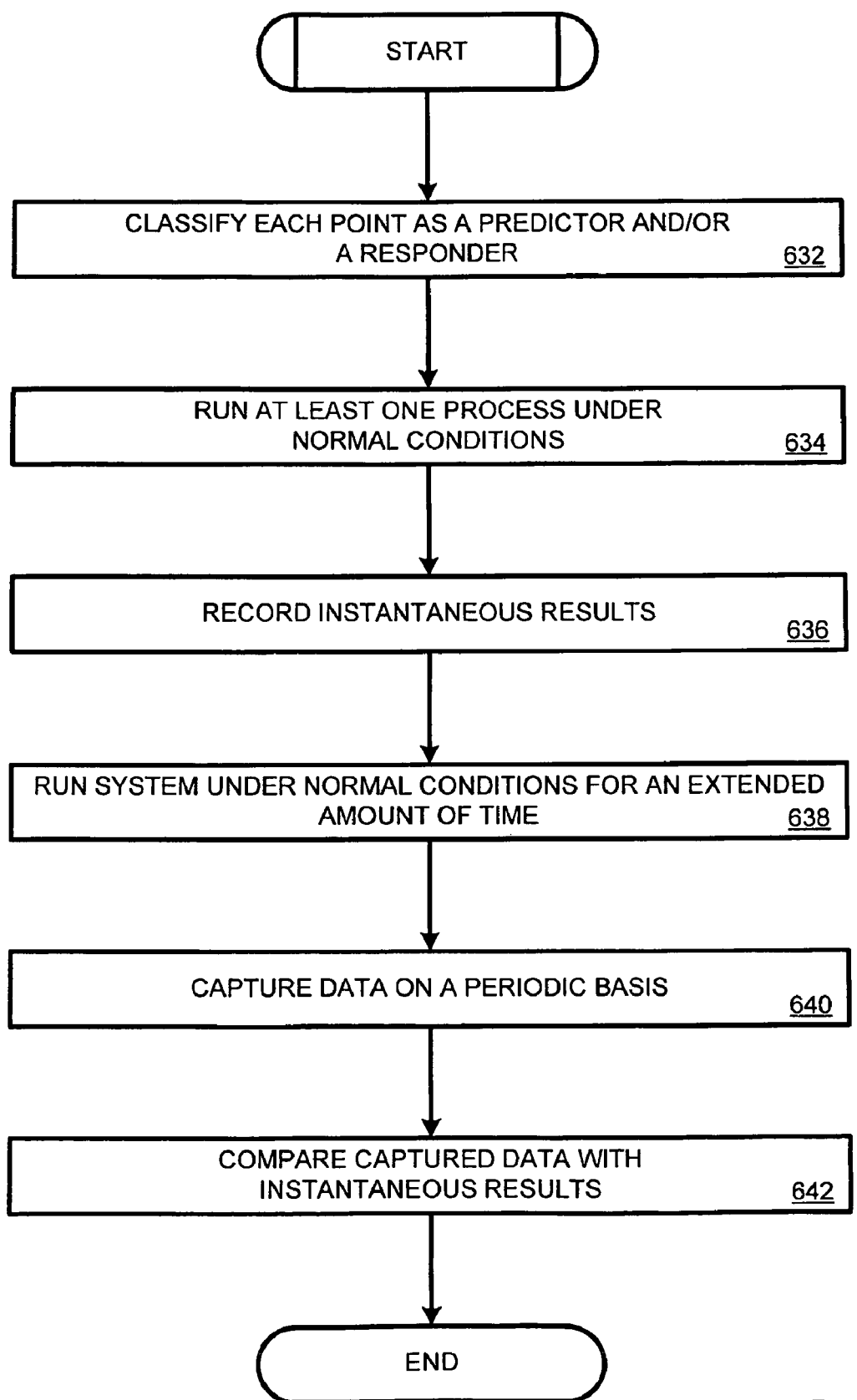
FIG. 6 depicts a flowchart illustrating an exemplary process that may be utilized for determining operation of an asset, such as the asset from FIG. 4.

FIG. 6 depicts a flowchart illustrating an exemplary process that may be utilized for determining operation of an asset, such as the asset 404 from FIG. 4. As illustrated in the nonlimiting example of FIG. 6, each point can be classified as a predictor and/or a responder (block 632). More specifically, as discussed above, one or more of the points may correspond in operation to one or more other points. Accordingly a relationship of predictor/responder may be made to indicate such a relationship.

Additionally, returning to the flowchart, at least one process can be run under normal conditions (block 634). The process may be monitored and instantaneous results of one or more of the points can be recorded (block 636). The process can also be run under normal conditions for an extended amount of time (block 638). The process can again be monitored and data from the extended operation can be captured on a periodic basis (block 640). The captured data can be compared with the instantaneous results (block 642).

Figure 7:
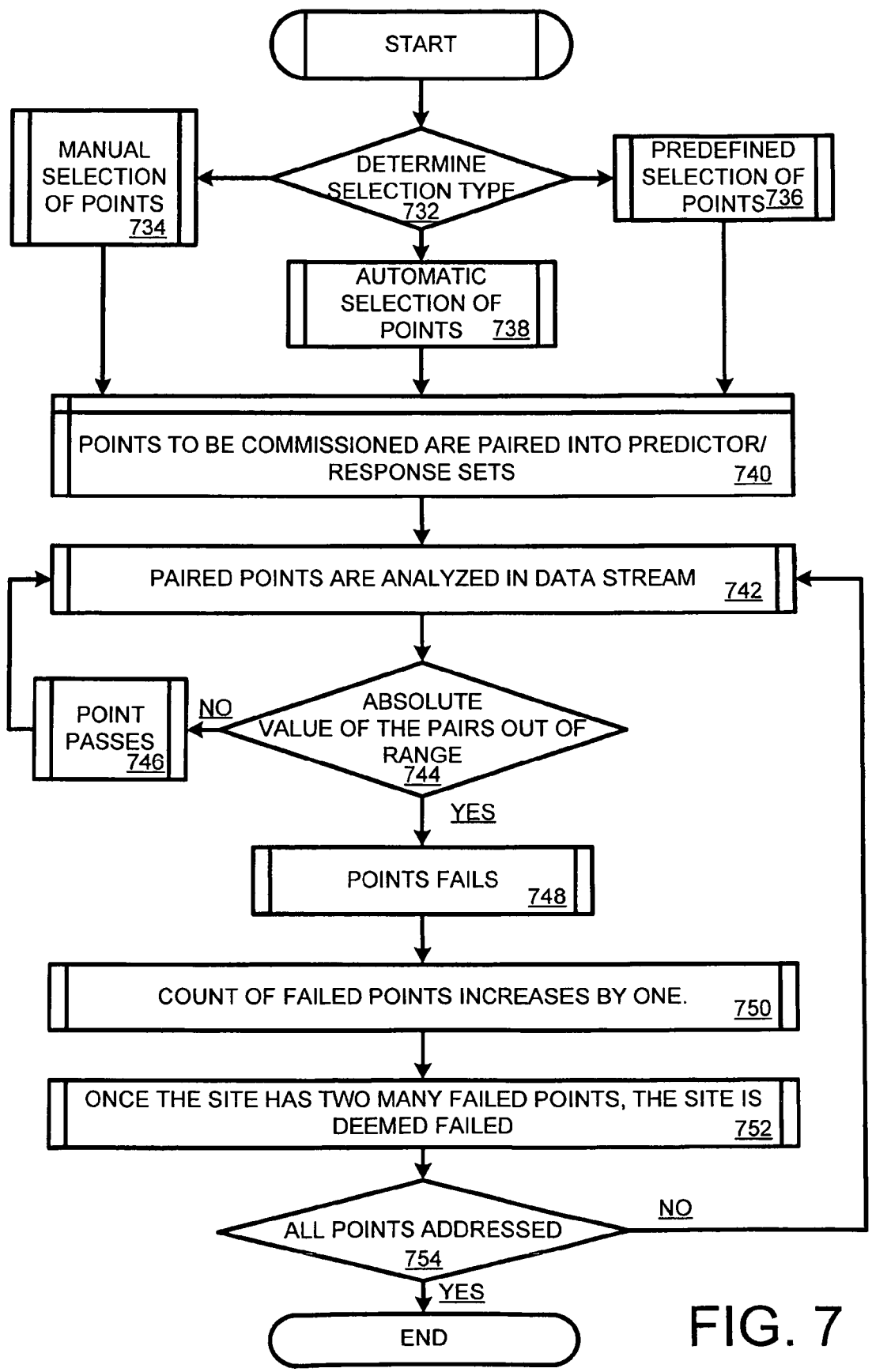
FIG. 7 depicts a flowchart illustrating an exemplary process that may be utilized for determining at least one predictor and/or responder, similar to the diagram from FIG. 6.

FIG. 7 depicts a flowchart illustrating an exemplary process that may be utilized for determining at least one predictor and/or responder, similar to the diagram from FIG. 6. As illustrated in the nonlimiting example of FIG. 7, a determination can be made as to the predictor and/or responder selection type (block 732). More specifically, in at least one exemplary embodiment, predictors and/or responders may be determined via a manual process (block 734), via a predefined selection of points (block 736), and/or an automatic selection of points (block 738). As a nonlimiting example, during manual selection, a user (e.g., a technician) may pair the two or more individual points into predictor/response sets. The predictor/response sets may include any number of points that have an operational relationship, as discussed above.

Similarly, the predictor/responder sets may be determined via a predefined selection of points. As a nonlimiting example, certain commonly used points can be pre-defined based on the asset to be commissioned. These points may include inputs and/or outputs of an asset that are commonly present in commissioning server 206 and/or asset 404 configuration. Additionally, in at least one exemplary embodiment, the commonality of these points may also be an indication that these points are critical to the successful execution of a sequence of operation loop (also known as a control loop). Since the strength of the commissioning output may depend on the strength of the predictor/response sets, the process of the predefining critical predictor/response pairs may serve as a quality assurance measure, as well. As a nonlimiting example, an exemplary system may be preconfigured with outside air temperature being in a predictor/responder set with a temperature reading from NOAA. Other pre-configurations may also be available.

Similarly, automatic selection of predictor/response sets may include a multi-stage process. In a first stage, sampled time series data (e.g., one minute) may be sorted by point name. From there, at least a portion of the point data may be analyzed via a correlation coefficient, which may include a mathematical process that determines the strength and/or direction of a linear relationship between two random variables, to each and every other point. This collection of results may then be analyzed for correlation coefficient values greater than (as a nonlimiting example) 0.95 or −0.95 (e.g., the absolute value of 0.95); these pairs may indicate an influence to each other. In the event that a plurality of points have correlation coefficient values greater than 0.95 or −0.95 then the point that is closer to 1 or −1 may be used. These identified pairs may then be nominated up to another process, machine, and/or human, to be confirmed as true predictor/response sets. This may ensure a high level of quality assurance, and may avoid the commissioning server 206 from automatically producing erroneous results.

Regardless, of the manner of selection, points to be commissioned may be paired into predictor/response sets (block 740). The paired points (where a pair of points may include two or more points) may then be analyzed in a data stream for error detection (block 742).

The error detection process may include monitoring defined predictor/response sets as a standardized number. Once the absolute value of the two standardized numbers move out predefined tolerance band the pair is said to have failed. More specifically, a determination may be made whether the absolute value of the pairs is out of range (block 744). If not, the point passes the error detection process (block 746) and the flowchart may return to block 742. If, on the other hand, the absolute value of the pairs is out of range (block 744), the point fails (block 748). A count of failed points may be increased by one (block 750). Once a system has surpassed a predefined number of failed pairs, the system is said to be failed (block 752). A determination may then be made whether all points have been addressed (block 754). If not, the process may return to block 742. If all points are addressed, the process may end.

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks might occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "scan," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method comprising:
   providing a commissioning server operative to receive information, via a wide area network, corresponding to monitored air temperatures associated with an environment;
   operating an environment controlling asset in accordance with a predetermined business strategy to control a temperature of the environment, the environment controlling asset being located remotely from the commissioning server and comprising at least one of a heating ventilation air condition (HVAC) system, a variable air volume component, an air handler unit, and a chiller, the environment controlling asset providing an input that affects the temperature associated with the environment, the commissioning server in communication with the environment controlling asset via the wide area network;
   identifying responder data points associated with the environment controlling asset, each of the responder data points corresponding to one of the monitored air temperatures associated with the environment controlling asset;
   storing information corresponding to the responder data points in the commissioning server;
   identifying predictor data points associated with the environment controlling asset, each of the predictor data points corresponding to one of the monitored air temperatures and one of the responder data points such that an operational correlation exists between each of the predictor data points and its corresponding responder data point, each one of the predictor data points and corresponding one of the responder data points defining a predictor/responder pair;
   storing information corresponding to the predictor data points in the commissioning server;
   monitoring the air temperatures;
   comparing the air temperatures associated with each of the predictor/responder pairs to determine deviations from predefined standards for the pairs; and
   identifying an error in operation of the environment controlling asset in accordance with the predetermined business strategy responsive to determining that any of the deviations fails to correspond to a respective predefined standard for the respective predictor/responder pair.

2. The method of claim 1, further comprising:
   recording instantaneous results from the responder data points.

3. The method of claim 1, further comprising:
   recording instantaneous results from the predictor data points.

4. The method of claim 1, further comprising:
   periodically recording results from the predictor data points.

5. The method of claim 1, further comprising:
   periodically recording results from the responder data points.

6. The method of claim 1, wherein the environment controlling asset includes a heating ventilation air conditioning (HVAC) system.

7. The method of claim 1, further comprising:
operating the environment controlling asset under normal conditions;
periodically recording results from the predictor data points;
periodically recording results from the responder data points;
recording instantaneous results from the predictor data points;
recording instantaneous results from the responder data points; and
comparing at least a portion of the periodically recorded data with at least a portion of the instantaneous results.

8. A system comprising:
a commissioning server in communication with an environment controlling asset via a wide area network, the environment controlling asset comprising at least one of a heating ventilation air condition (HVAC) system, a variable air volume component, an air handler unit, and a chiller, the environment controlling asset providing an input that affects an interior temperature associated with at least one respective zone of an interior environment in accordance with a predetermined business strategy;
a first classifying component executed in the commissioning server classifying at least one data point of the environment controlling asset as a responder data point;
a second classifying component executed in the commissioning server classifying at least one other data point of the environment controlling asset as a predictor data point, the at least one predictor data point providing operation validation data regarding the at least one responder data point, the at least one predictor data point comprising an outside air temperature exterior to the interior environment captured by a remote temperature reading source accessible to the commissioning server via the wide area network; and
a validating component executed in the commissioning server validating an effect on the interior temperature of the interior environment of the at least one responder data point by monitoring sensor data associated with the at least one responder data point and the at least one predictor data point, the at least one predictor data point and the at least one responder data point defining a predictor/responder pair, the validating component being further operative to validate proper operation of the environment controlling asset in accordance with the predetermined business strategy based on behavior of the predictor/responder pair.

9. The system of claim 8, further comprising:
a first operating component operating the environment controlling asset under normal conditions; and
a first recording component recording instantaneous results from the responder data point.

10. The system of claim 8, further comprising:
a second operating component operating the environment controlling asset under normal conditions; and
a second recording component configured to record instantaneous results from the predictor data point.

11. The system of claim 8, further comprising:
a third operating component operating the environment controlling asset under normal conditions; and
a third recording component periodically recording results from the predictor data point.

12. The system of claim 8, further comprising:
a fourth operating component operating the environment controlling asset under normal conditions; and
a fourth recording component periodically recording results from the responder data point.

13. The system of claim 8, wherein system is implemented as a non-transitory computer-readable medium.

14. The system of claim 8, further comprising:
a fifth operating component operating the environment controlling asset under normal conditions;
a fifth recording component periodically recording results from the predictor data point;
a sixth recording component periodically recording results from the responder data point;
a seventh recording component recording instantaneous results from the predictor data point;
an eighth recording component recording instantaneous results from the responder data point; and
a comparing component comparing at least a portion of the periodically recorded data with at least a portion of the instantaneous results.

15. A system comprising:
means for remote commissioning of an environment controlling asset via a wide area network the environment controlling asset comprising at least one of a heating ventilation air condition (HVAC) system, a variable air volume component, an air handler unit, and a chiller, the environment controlling asset providing an input that affects an interior temperature associated with at least one respective zone of an interior environment in accordance with a predetermined business strategy;
means for classifying at least one data point of the environment controlling asset as a responder data point;
means for classifying at least one other data point of the environment controlling asset as a predictor data point, the at least one predictor data point providing operation validation data regarding the at least one responder data point, the at least one predictor data point comprising an outside air temperature captured by a remote temperature reading source accessible to the commissioning means via the wide area network; and
means for validating an effect on the interior temperature of the interior environment of the at least one responder data point by monitoring sensor data associated with the at least one responder data point and the at least one predictor data point, the at least one predictor data point and the at least one responder data point defining a predictor/responder pair, the means for validating being further operative to validate proper operation of the environment controlling asset in accordance with the predetermined business strategy based on behavior of the predictor/responder pair.

16. The system of claim 15, further comprising:
means for operating the environment controlling asset under normal conditions; and
means for recording instantaneous results from the responder data point.

17. The system of claim 15, further comprising:
means for operating the environment controlling asset under normal conditions; and
means for recording instantaneous results from the predictor data point.

18. The system of claim 15, further comprising:
means for operating the environment controlling asset under normal conditions; and
means for periodically recording results from the predictor data point.

19. The system of claim 15, further comprising:
means for operating the environment controlling asset under normal conditions; and means for periodically recording results from the responder data point.

20. The system of claim 15, further comprising:

means for operating the environment controlling asset under normal conditions;

means for periodically recording results from the predictor data point;

means for periodically recording results from the responder data point;

means for recording instantaneous results from the predictor data point;

means for recording instantaneous results from the responder data point; and means for comparing at least a portion of the periodically recorded data with at least a portion of the instantaneous results.

* * * * *